United States Patent
Jang et al.

(10) Patent No.: US 7,912,131 B2
(45) Date of Patent: Mar. 22, 2011

(54) SELECTIVE PREDICTION ENCODING AND DECODING METHODS AND DEVICES WITH AC/DC AND ADVANCED VIDEO CODING PREDICTION

(75) Inventors: Euee-S Jang, Seoul (KR); Yung-Lyul Lee, Seoul (KR); Sun-Young Lee, Seoul (KR); Sung-Won Park, Seoul (KR); Jong-Woo Won, Seoul (KR); Yong-Ho Cho, Seoul (KR); Chung-Ku Lee, Inchon (KR)

(73) Assignee: HUMAX, Co., Ltd., Gyeonggi-do (KR)

( * ) Notice: Subject to any disclaimer, the term of this patent is extended or adjusted under 35 U.S.C. 154(b) by 1549 days.

(21) Appl. No.: 11/256,188

(22) Filed: Oct. 24, 2005

(65) Prior Publication Data
US 2006/0109911 A1    May 25, 2006

(30) Foreign Application Priority Data
Oct. 22, 2004   (KR) .................. 10-2004-0084918

(51) Int. Cl.
*H04N 11/02* (2006.01)
(52) U.S. Cl. .............................. 375/240.18; 375/240.24
(58) Field of Classification Search .............. 375/240.18
See application file for complete search history.

(56) References Cited

U.S. PATENT DOCUMENTS

| | | | |
|---|---|---|---|
| 5,974,184 A | 10/1999 | Eifrig et al. | |
| 6,005,622 A * | 12/1999 | Haskell et al. | 375/240.24 |
| 6,360,016 B1 * | 3/2002 | Shen et al. | 382/238 |
| 2004/0028129 A1 * | 2/2004 | Nagumo et al. | 375/240.08 |
| 2004/0066976 A1 | 4/2004 | Inokuma | |
| 2004/0114817 A1 * | 6/2004 | Jayant et al. | 382/239 |
| 2004/0233993 A1 * | 11/2004 | Johansen et al. | 375/240.18 |
| 2005/0008232 A1 * | 1/2005 | Shen et al. | 382/233 |
| 2005/0053158 A1 * | 3/2005 | Regunathan et al. | 375/240.25 |
| 2005/0111545 A1 * | 5/2005 | Prabhakar et al. | 375/240.03 |
| 2005/0259688 A1 * | 11/2005 | Gordon | 370/477 |

FOREIGN PATENT DOCUMENTS

| | | |
|---|---|---|
| CN | 1198639 A | 11/1998 |
| CN | 1378750 A | 11/2002 |
| CN | 1492685 A | 4/2004 |

(Continued)

OTHER PUBLICATIONS

Jang, Low-Complexity MPEG-4 Shape Encoding toward Realtime Object-Based Applications, ETRI Journal, vol. 26, No. 2, pp. 122-135, Apr. 2004.*

(Continued)

*Primary Examiner* — David P Rashid
(74) *Attorney, Agent, or Firm* — Baker Botts L.L.P.

(57) ABSTRACT

There are provided selective prediction encoding and decoding methods and selective prediction encoding and decoding devices. The selective prediction encoding device selects and performs one of an AC/DC prediction encoding method and an intra prediction encoding method which corresponds to the smaller of code amount from AC/DC prediction and an amount of AVC intra coding, records information indicating the selected encoding method in a header of a bit stream, and transmits the bit stream to the selective prediction decoding device. The selective prediction decoding device decodes the transmitted bit stream by the use of a decoding process corresponding to the information recorded in the header. Accordingly, it is possible to improve compression ratio and image quality by using the selective prediction encoding and decoding methods.

6 Claims, 8 Drawing Sheets

FOREIGN PATENT DOCUMENTS

WO             0111891 A1     2/2001

OTHER PUBLICATIONS

Lee et al., Selective Motion Estimation for Fast Video Encoding, PCM 2004, LNCS 3333, pp. 630-638, 2004.*

Tan et al., Intra Prediction (T9/T10) and DC/Ac Prediction Results, International Organisation for Standardisation Coding of Moving Pictures and Associated Audio Information ISO/IEC JTC1/SC29/WG11 MPEG96/0939 Jul. 1996.*

Chinese Patent Office, Action for Patent Application No. 200510129152.2, issued Jan. 9, 2009. (Counterpart to above-captioned U.S. patent application.)

State Intellectual Property Office, P.R. China; Second Office Action in Chinese Patent Application No. 200510129152.2 (counterpart to the above-captioned U.S. patent application) mailed Sep. 4, 2009.

* cited by examiner

Fig. 5

| mcbpc [1-9] | Prediction Flag [1] | cbpy [1-6] | dquant [2] | #1 block | ... | #6 block |

SELECTIVE PREDICTION ENCODING AND DECODING METHODS AND DEVICES WITH AC/DC AND ADVANCED VIDEO CODING PREDICTION

BACKGROUND OF THE INVENTION

1. Field of the Invention

The present invention relates to encoding and decoding methods and encoding and decoding devices, and more particularly, to selective prediction encoding and decoding methods and selective prediction encoding and decoding devices that can improve performance of a video codec.

2. Description of the Related Art

Generally, a video coding method can be classified into an intra coding method of performing an intra-screen encoding method such as I frame and an inter coding method of performing an inter-screen encoding method such as P frame or B frame. A conventional prediction encoding method of coding an intra frame will be described with reference to FIGS. 1 and 2.

FIG. 1 is a diagram illustrating a quantization table used for AC/DC prediction of a conventional MPEG-4 intra coding method.

The AC/DC prediction shown in FIG. 1 is used for improving a compression ratio of a macro block in an intra mode coding. In an example of the intra mode coding used in MPEG-4 which is based on the AC/DC prediction, a position of a current block in a reference block is determined with reference to a direction of the AC/DC coefficients of the reference block, a AC/DC prediction value of the current block is calculated, and then the current block is encoded in accordance with the calculated AC/DC prediction value by the use of an entropy (or Huffman) coding process.

The DC coefficient 100 of the current block is encoded using a difference between the DC coefficient and DC coefficients of a left or upper block. The AC coefficient 110 is encoded by the use of a Run Length coding or a Huffman coding after the values of the first row or column are predicted in the direction used in the DC prediction. A quantization table including DCT coefficients obtained by performing a DCT operation in a unit of macro block is shown in FIG. 1. Here, DC components and AC components are independently quantized. It should be noticed, however, that the DC components and the AC components are independently quantized in the intra mode, but both components are simultaneously quantized in the inter mode. In the quantization table, no predetermined value exists but the coefficients may be set individually or may have one constant value. The DC coefficient and the AC coefficient in the quantized DCT coefficients are independently predicted. A difference value between the DC coefficient of the current block and the DC coefficient of the left or upper block thereof is encoded by the use of the entropy coding. A difference value between the AC coefficient of the current block and the AC coefficient in the first row or column of the reference block in the direction determined in the DC prediction is obtained, other AC components are encoded by the use of the entropy coding after arranging the AC component values of the current block in one line by a zigzag scan 120. However, it is obvious to those skilled in the art that the AC prediction may not be always performed and a block not requiring the AC prediction may exist.

FIG. 2 is an explanatory diagram illustrating an AVC (Advanced Video Coding) intra prediction of a conventional AVC intra coding method.

The AVC intra prediction shown in FIG. 2 is used for improving a coding efficiency of a macro block, by performing a prediction in four directions 210, 220, 230, and 240 with information on surround blocks in a unit of macro block and selecting one direction in which a value of motion compensation error (SAD: Sum of Absolute Difference) such as MSE (Mean Square Error) is smallest. For reference, the AVC intra prediction employs 4×4 mode (nine modes directions) and 16×16 (four modes directions) for luminance and 8×8 mode (four modes-directions) for chrominance.

Since it has been conventionally considered that the coding efficiency of the AVC intra prediction is greater than that of the AC/DC prediction, the intra coding has been performed using only the AVC intra prediction. In some macro blocks, the AC/DC prediction may often provide a compression ratio greater than the AVC intra prediction. However, an efficient coding prediction which can utilize two predictions in parallel has not been developed. In addition, a method of efficiently decoding bit streams encoded by the use of various selective encoding methods has not been yet developed.

SUMMARY OF THE INVENTION

The present invention is contrived to improve performance of an MPEG-4 codec by combining the merits of the related arts. It is an object of the present invention is to provide selective prediction encoding method and device which can selectively use an AC/DC prediction encoding method of an MPEG-4 codec and an intra prediction encoding method of an AVC codec. That is, it is an object of the present invention to provide a method and a device that can selectively perform an encoding method having a high compression ratio based on an amount of compression, that is, a bit rate by applying an AVC intra prediction to MPEG-4.

It is another aspect of the present invention to provide selective prediction encoding and decoding methods and selective prediction encoding and decoding devices that can improve the compression ratio and image quality of an MPEG-4 codec by selectively using an AC/DC prediction encoding method of an MPEG-4 codec and an intra prediction encoding method of an AVC codec and using decoding methods corresponding thereto.

It is still another aspect of the present invention to provide selective prediction encoding and decoding methods and selective prediction encoding and decoding devices that can improve image quality without variation in compression ratio by selectively using an intra prediction encoding method among encoding methods.

Other objects of the present invention will become apparent from exemplary embodiments to be described later.

According to an aspect of the present invention, there is provided a selective prediction encoding method comprising steps of: (a) performing an AC/DC prediction and an AVC (Advanced Video Coding) intra prediction to a macro block and generating code amount from AC/DC prediction and an amount of AVC intra coding; (b) selecting one of an AC/DC prediction encoding method and an AVC intra prediction encoding method, which corresponds to the smaller of the amount of AC/DC coding and the amount of AVC intra coding; and (c) performing the selected prediction encoding method to the macro block, wherein a flag indicating the AC/DC prediction encoding method is recorded in a flag field when the AC/DC prediction encoding method is selected and a flag indicating the AVC intra prediction encoding method is recorded in the flag field when the AVC intra prediction encoding method is selected.

It may be checked whether the macro block is a predetermined unit of process and then the steps (a) to (c) may be performed to the macro block, only when the macro block is the predetermined unit of process.

In the step (b), one of the AC/DC prediction encoding method and the AVC intra prediction encoding method may be selected in accordance with a predetermined criterion, when the amount of AC/DC coding and the amount of AVC intra coding are equal to each other.

The flag field may be included in an MB-layer header of a bit stream.

According to another aspect of the present invention, there is provided a selective prediction encoding device comprising: an AC/DC prediction unit performing an AC/DC prediction to a macro block and generating code amount from AC/DC prediction; an AVC (Advanced Video Coding) intra prediction unit performing AVC intra prediction to the macro block and generating an amount of AVC intra coding; and a control unit controlling the AC/DC prediction unit and the AVC intra prediction unit, selecting one of an AC/DC prediction encoding method and an AVC intra prediction encoding method which corresponds to the smaller of the amount of AC/DC coding and the amount of AVC intra coding, and performing the selected encoding method.

The control unit may check whether the macro block is a predetermined unit of process and may control the AC/DC prediction unit and the AVC intra prediction unit to generate the amounts of coding only when the macro block is the predetermined unit of process.

The control unit may include a coding amount comparison section comparing the amount of AC/DC coding and the amount of AVC intra coding, selecting one of the AC/DC prediction encoding method and the AVC intra prediction encoding method which corresponds to the smaller of the amount of AC/DC coding and the amount of AVC intra coding, and performing the selected encoding method; and a flag recording section recording a flag indicating the AC/DC prediction encoding method in a flag field when the AC/DC prediction encoding method is selected and recording a flag indicating the AVC intra prediction encoding method in the flag field when the AVC intra prediction encoding method is selected.

The coding amount comparison section may select one encoding method of the AC/DC prediction encoding method and the AVC intra prediction encoding method in accordance with a predetermined criterion, when the amount of AC/DC coding and the amount of AVC intra coding are equal to each other.

According to another aspect of the present invention, there is provided an encoder or a decoder comprising the selective prediction encoding device described above.

According to still another aspect of the present invention, there is provided a selective prediction decoding device comprising: a flag value recognizing unit recognizing a prediction flag value included in a header of a received bit stream; an AC/DC decoding unit decoding the bit stream by the use of an AC/DC prediction decoding process; an intra decoding unit decoding the bit stream by the use of an intra prediction decoding process; and a control unit controlling the AC/DC decoding unit and the intra decoding unit to activate one of the AC/DC decoding unit and the intra decoding unit in accordance with the prediction flag value recognized by the flag value recognizing unit. In this case, the prediction flag value may be recorded in a prediction flag field of an MB-layer header of the bit stream.

According to still another aspect of the present invention, there is provided a selective prediction decoding method comprising steps of: recognizing a prediction flag value included in a header of a received bit stream; and decoding the bit stream by the use of one of an AC/DC prediction decoding process and an intra prediction decoding process in accordance with the recognized prediction flag value. In this case, the prediction flag value may be recorded in a prediction flag field of an MB-layer header of the bit stream.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram schematically illustrating MB-layer syntax of MPEG-4 Standard according to an exemplary embodiment of the present invention;

DETAILED DESCRIPTION OF THE EMBODIMENTS

Figure 1:
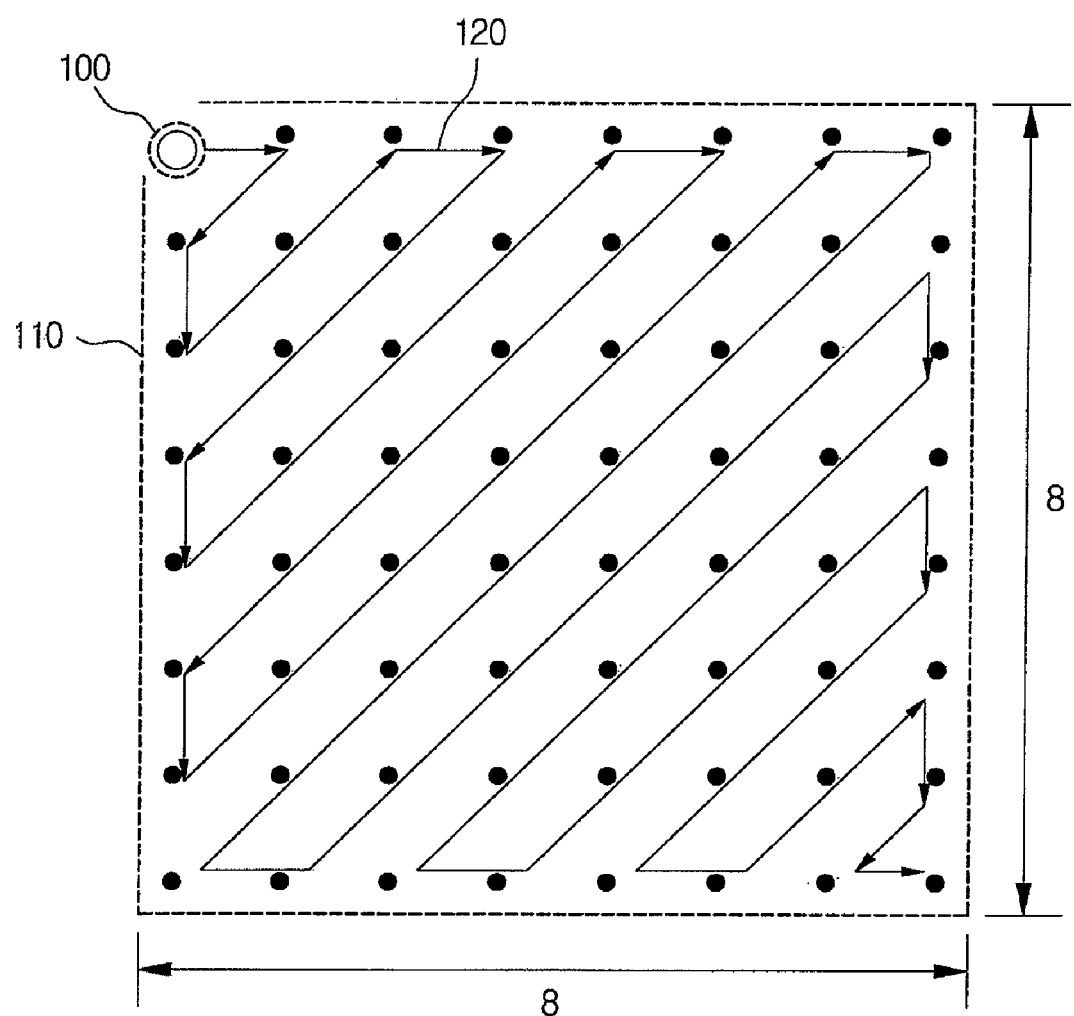
FIG. 1 is a diagram illustrating a quantization table used for AC/DC prediction of a conventional MPEG-4 intra coding method.
Figure 2:
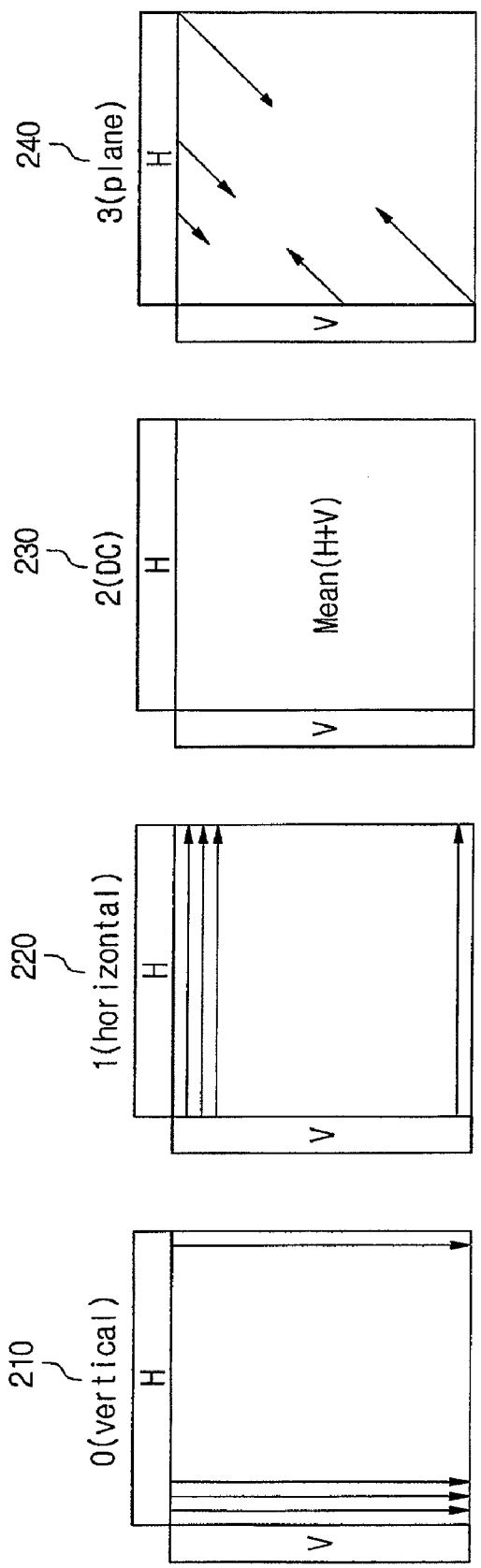
FIG. 2 is an explanatory diagram illustrating an AVC (Advanced Video Coding) intra prediction of a conventional AVC intra coding method.

Hereinafter, exemplary embodiments of the present invention will be described in detail with reference to the attached drawings such that the present invention can be easily put into practice by those skilled in the art. In the drawings, like elements are denoted by like reference numerals and thus repeated description thereof is omitted.

An AVC (Advanced Video Coding) intra prediction employs 4×4 mode (nine modes-directions in a unit of 4×4 block) and 16×16 (four modes-directions in a unit of 16×16 block) for luminance and 8×8 mode (four modes-directions in a unit of 8×8 block) for chrominance. However, a unit of process having the same size is described for the purpose of convenient explanation in the following description. For example, in MPEG-4 Standard, a DCT (Discrete Cosine Transform) operation is performed using an 8×8 block as a basic unit of process, but in AVC Standard (that is, MPEG-4 AVC Standard), a transform operation is performed using a 4×4 block as a basic unit of process. A basic unit of process in the present invention may be an n×m block (where n and M are any natural number). Hereinafter, 8×8 blocks or 16×16 blocks used mainly in an MPEG-4 codec will be described as a basic unit of process, but the blocks in the MPEG-4 codec may be converted into 4×4 blocks which are used as a basic unit of process.

(Selective Prediction Encoding Method)

Figure 3:
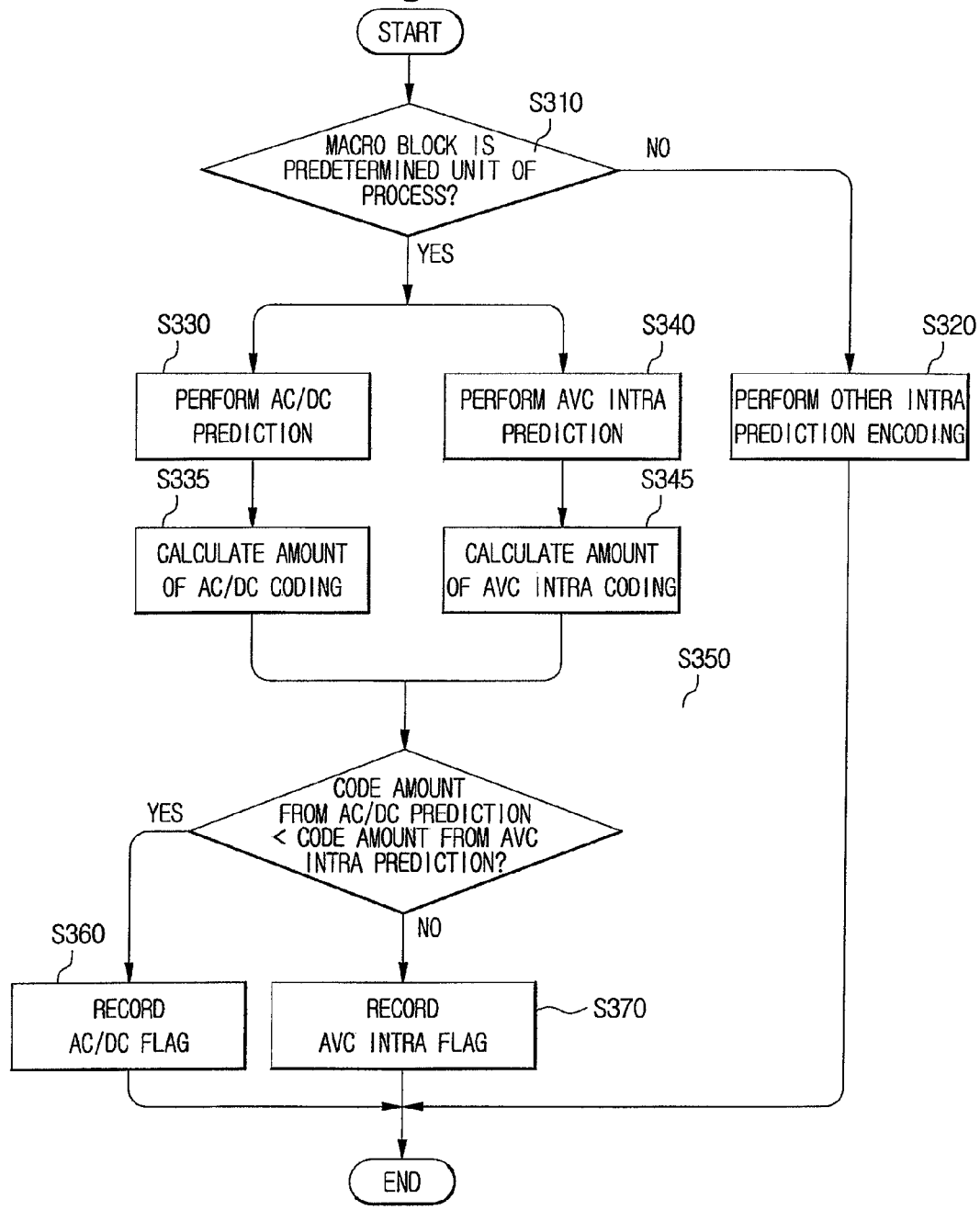
FIG. 3 is a flowchart illustrating a selective prediction encoding method according to an exemplary embodiment of the present invention.

FIG. 3 is a flowchart illustrating a selective prediction encoding method according to an exemplary embodiment of the present invention.

Generally, the AC/DC prediction is used in MPEG-4 standard and the intra prediction is used in MPEG-4 AVC standard. Since the AVC standard supports the transform operation in a unit of 4×4 blocks, the intra prediction employing nine prediction models in a unit of 4×4 blocks is most suitable for the AVC codec. However, when the intra prediction is applied to MPEG-4, an efficient compression ratio cannot be obtained due to increase in bit for displaying the nine prediction models. However, in case of the 16×16 prediction model, the 16×16 intra prediction may be more efficient than the AC/DC prediction, depending upon blocks. According to the present invention, even in such a case, an efficient encoding method can be performed.

Now, the selective prediction encoding method according to an exemplary embodiment of the present invention will be described with reference to FIG. 3.

In step S310, a unit of process for a macro block to be encoded is determined. For example, the selective prediction encoding method according to the present invention can be applied to the macro block which is a predetermined unit of n×m (where n and m are a natural number) block (for example, a unit of 8×8 or 16×16 block) and in step S320, the AVC intra prediction encoding method or other intra prediction encoding methods having been developed or to be developed in the future may be performed to the other blocks. Of course, it is obvious that the selective prediction encoding method according to the present invention can be applied to any macro block having any unit of block.

In step S330, the AC/DC prediction is performed to the macro block as a predetermined unit of process (or regardless of a unit of process) and in step S335, a value obtained through the AC/DC prediction is encoded by the use of an entropy encoding. The AC/DC prediction may be performed after the AVC prediction is performed or both predictions may be simultaneously performed.

In step S350, code amount from AC/DC prediction and an amount of AVC intra coding are compared with each other and one of an AC/DC prediction encoding method and an AVC intra prediction encoding method which corresponds to the smaller amount of coding is performed. An amount of coding means an amount obtained by encoding a predicted value by the use of the entropy coding, which is obvious to those skilled in the art. When the amount of AC/DC coding is smaller, the AC/DC prediction encoding method is selected in step S360 and a flag indicating the AC/DC prediction encoding method is recorded in a flag field (for example, a prediction flag field: see FIG. 5). Similarly, when the amount of AVC intra coding is smaller, the AVC intra prediction encoding method is selected in step S370 and a flag indicating the AVC intra prediction encoding method is recorded in the flag field. When the amount of AC/DC coding is equal to the amount of AVC intra coding, it may be set that one encoding method is selected in accordance with a predetermined default value.

(Selective Prediction Encoding Device)

Figure 4:
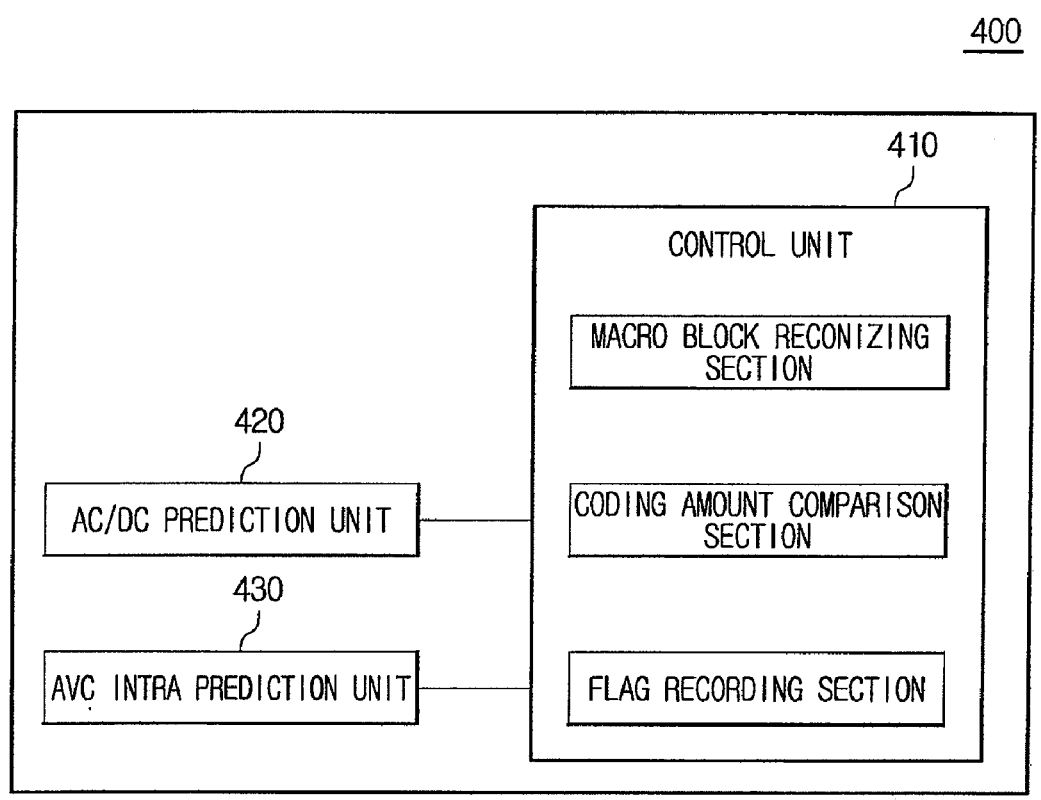
FIG. 4 is a block diagram illustrating a selective prediction encoding device according to an exemplary embodiment of the present invention.

FIG. 4 is a block diagram illustrating a selective prediction encoding device according to an exemplary embodiment of the present invention.

The selective prediction encoding device according to the present invention can be provided in an encoder or a decoder and can selectively perform the AC/DC prediction encoding method of an MPEG-4 codec and the intra prediction encoding method of an AVC codec. The decoder may include the encoder and the selective prediction encoding device according to the present invention may be commonly provided in the encoder and the decoder. In the following description, it is supposed that the selective prediction encoding device according to the present invention is included in the encoder.

As shown in FIG. 4, the selective prediction encoding device 400 includes a control unit 410, an AC/DC prediction unit 420, and an AVC intra prediction unit 430. The control unit 410 includes a macro block recognizing section 411, a coding amount comparing section 413, and a flag recording section 415.

The macro block recognizing section 411 checks whether a macro block to be encoded is a predetermined macro block and performs the selective prediction encoding method according to the present invention to the macro block when it is the predetermined macro block. However, as described above, when it is set that the present invention can be applied regardless of the unit (size) of blocks, the macro block recognizing section 411 can be omitted.

The coding amount comparing section 413 compares the amount of AC/DC coding with the amount of AVC intra coding and encodes the macro block by the use of the encoding method having the smaller amount of coding among them.

The flag recording section 415 records a flag indicating the AC/DC prediction encoding method in a predetermined flag field (for example, a prediction flag field: see FIG. 5), when the AC/DC prediction encoding method is selected, and records a flag indicating the AVC intra prediction encoding method in the predetermined flag field (for example, a prediction flag field: see FIG. 5), when the AVC intra prediction encoding method is selected.

The AC/DC prediction unit 420 performs the AC/DC prediction and generates code amount from AC/DC prediction. The AVC intra prediction unit 430 performs the AVC intra prediction and generates an amount of AVC intra coding.

(Structure of Header of Bit Stream)

FIG. 5 is a diagram schematically illustrating MB-layer syntax of MPEG-4 Standard according to an exemplary embodiment of the present invention.

The MB-layer syntax of the MPEG-4 standard shown in FIG. 5 includes a header part and a data part. The header part includes a prediction flag of k bits (where k is a natural number) indicating which of the AC/DC prediction encoding method and the intra prediction encoding method is used.

The selective prediction encoding device according to the present invention can determine what decoding process should be used by the use of the flag value recorded in the prediction flag field.

(Selective Prediction Decoding Device)

A selective prediction decoding device according to the present invention can have a structure similar to that of a general decoding device, except that an element (for example, flag value recognizing section) recognizing the flag value recorded in the header part of the received bit stream and elements (for example, AC/DC decoding unit and intra decoding unit) performing a decoding process by the use of an inverse AC/DC prediction or an inverse intra prediction in accordance with the recognized flag value are further provided. In addition, a control unit allowing a decoding process corresponding to the recognized flag value to be performed may be further provided. Since those skilled in the art can sufficiently understand the structure of the decoding device through the explanation described above, detailed description of the decoding device will be omitted.

Figure 6:
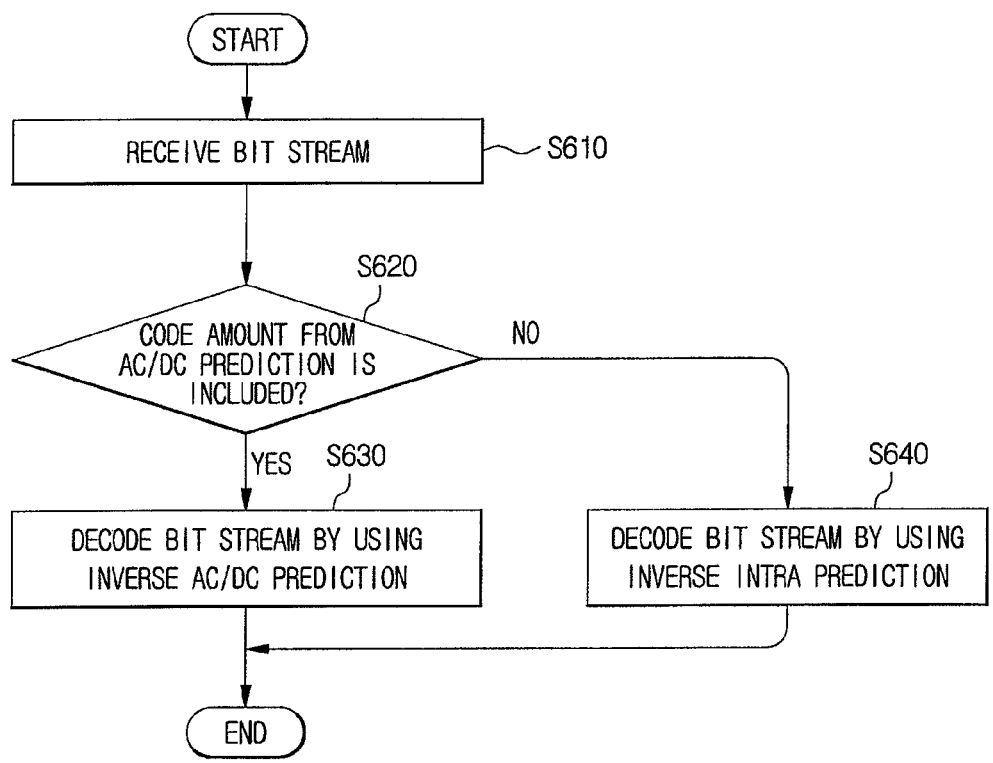
FIG. 6 is a flowchart illustrating a selective prediction decoding method according to an exemplary embodiment of the present invention.

FIG. 6 is a flowchart illustrating a selective prediction decoding method according to an exemplary embodiment of the present invention.

Referring to FIG. 6, a decoding device receives a bit stream from an encoding device in step S610. The bit stream is a bit stream to which the AC/DC prediction encoding method and the intra prediction encoding method are selectively performed.

In step S620, the decoder checks whether a flag value recorded in a prediction flag of a header part of MBA-layer syntax corresponds to the AC/DC prediction encoding method.

When the flag value corresponds to the AC/DC prediction encoding method an MPEG-4 AC/DC prediction decoding process is performed to the bit stream in step S630.

When the flag value does not correspond to the AC/DC prediction encoding method (that is, when the flag value corresponds to the AVC intra prediction encoding method), an MPEG-4 AVC intra prediction decoding process is performed to the bit stream in step S640.

(Comparison in Performance and Bit Rated)

Figure 7:
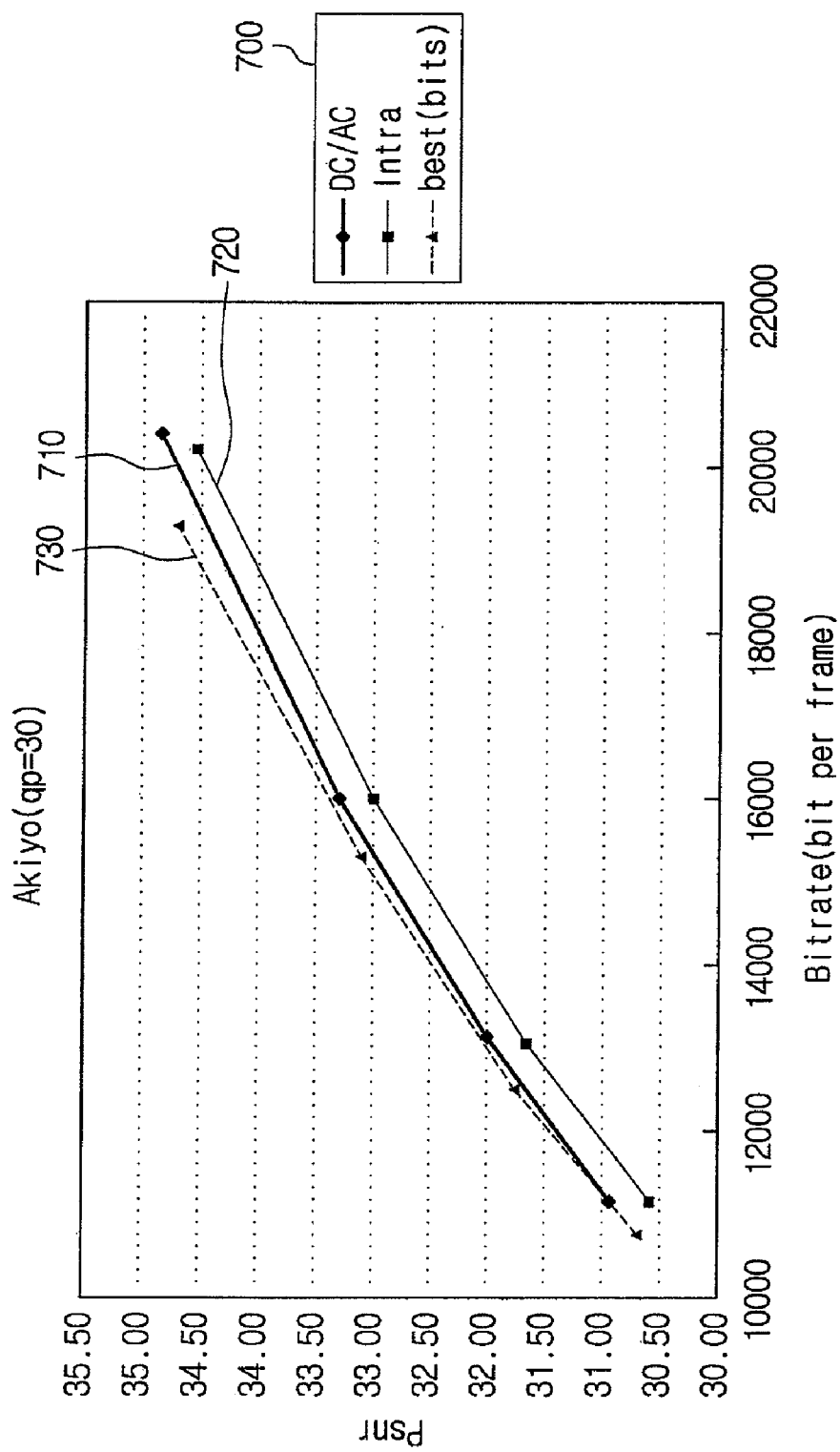
FIG. 7 is a graph illustrating a performance comparison result about a first test image according to an exemplary embodiment of the present invention.
Figure 8:
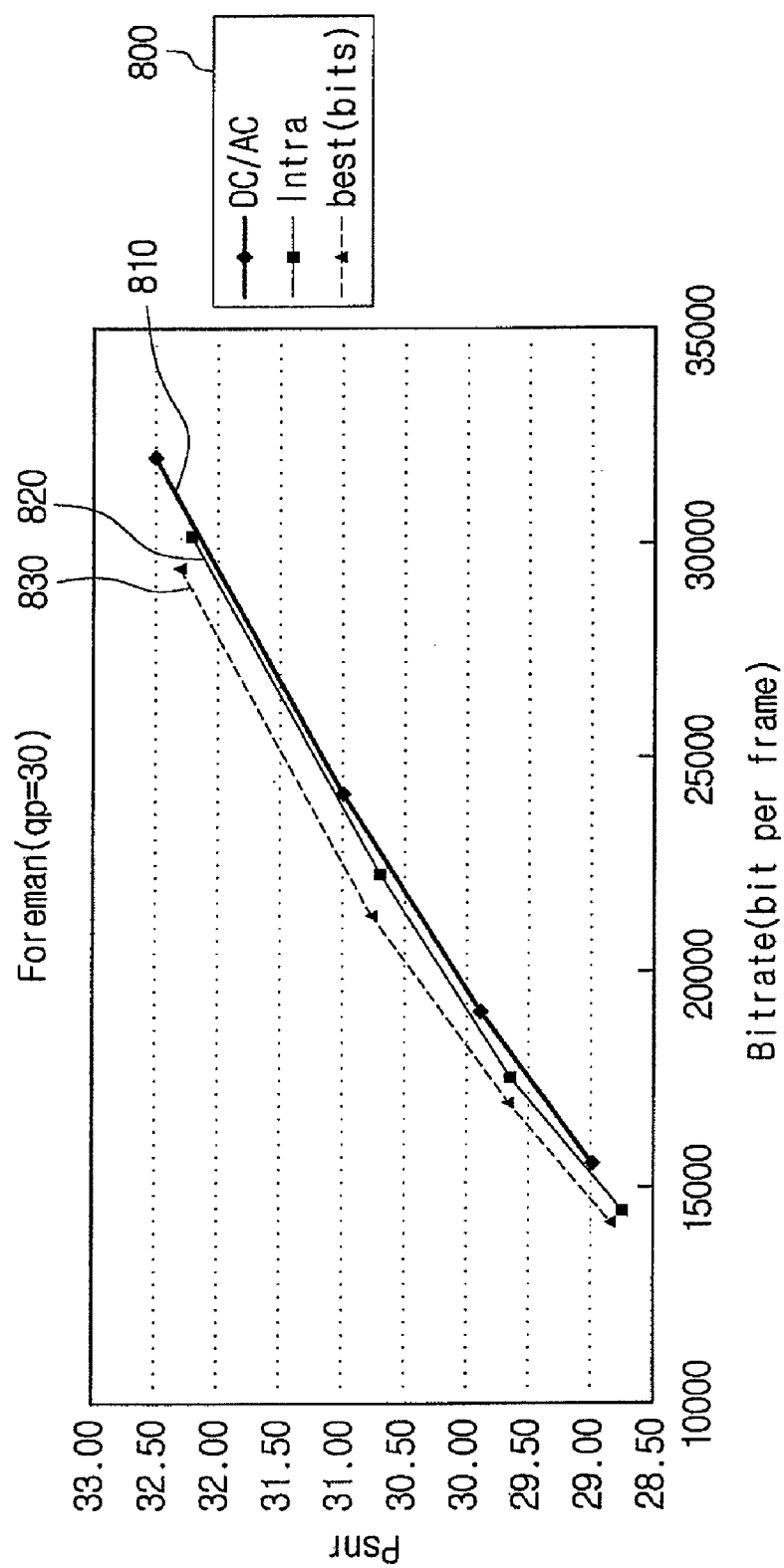
FIG. 8 is a graph illustrating a performance comparison result about a second test image according to an exemplary embodiment of the present invention.

Now, in the AC/DC prediction and the AVC intra prediction, a result of a test in which four modes of 16×16 block are applied to the MPEG-4 codec will be described. The test was executed in accordance with MPEG-4 in which all the processes are performed in a unit of macro block (16×16). The test result is described with reference to FIG. 7 which shows a performance comparison result about a first test image according to an exemplary embodiment of the present invention and FIG. 8 which shows a performance comparison result about a second test image according to an exemplary embodiment of the present invention. The actual test images (Akiyo and Foreman) used in FIGS. 7 and 8 are formal test images for MPEG with a YUV (4:2:0) color format and a resolution of 352×288. In the figures, AC/DC indicates an MPEG-4 employing the AC/DC prediction encoding method, Intra indicates an MPEG-4 employing the AVC intra prediction encoding method, and Best (bits) indicates an MPEG-4 employing the selective prediction encoding method according to the present invention.

RD curves for MPEG-4 710 employing the AC/DC prediction encoding method, MPEG-4 720 employing the intra prediction encoding method, and MPEG-4 730 employing the selective prediction encoding method according to the present invention are shown in FIG. 7. As for the first test image (Akiyo) which is a video of news broadcasting, the RD curve of the selective prediction encoding method according to the present invention is improved in image quality by about 0.1 db for the same bit rate, compared with the conventional MPEG-4 employing the AC/DC prediction encoding method and the MPEG-4 employing the intra prediction encoding method.

Similarly, RD curves for MPEG-4 810 employing the AC/DC prediction encoding method, MPEG-4 820 employing the intra prediction encoding method, and MPEG-4 830 employing the selective prediction encoding method according to the present invention are shown in FIG. 8. As for the second test image (Foreman) which is a video including laborers in a site of construction, the RD curve of the selective prediction encoding method according to the present invention is improved in image quality by about 0.5 db for the same bit rate, compared with the conventional MPEG-4 employing the AC/DC prediction encoding method and the MPEG-4 employing the intra prediction encoding method.

As described above, according to the present invention, it is possible to improve the compression ability by selectively using the AC/DC prediction encoding method of MPEG-4 codec and the intra prediction encoding method of AVC codec.

According to the present invention, it is also possible to improve the compression ratio and the image quality of the MPEG-4 codec by selectively using the AC/DC prediction encoding method of MPEG-4 codec and the intra prediction encoding method of AVC codec and using a decoding method corresponding thereto.

In addition, it is possible to improve the image quality with the same compression efficiency by selectively using the intra prediction encoding method among encoding methods.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A non-transitory, computer-readable medium containing computer readable instructions that cause a computer to perform a selective prediction encoding method for identifying an encoding method for a macro block, comprising the steps of:
   performing AC/DC prediction and Advanced Video Coding (AVC) intra prediction for said macro block;
   generating an AC/DC code amount from the AC/DC prediction and an AVC code amount from the AVC intra prediction for said macro block;
   selecting, between an AC/DC prediction encoding method and an AVC intra prediction encoding method for said macro block, the method which corresponds to the smaller of said AC/DC code amount and said AVC code amount;
   performing the selected prediction encoding method to said macro block; and,
   recording an AC/DC flag indicating the AC/DC prediction encoding method in a flag field when the AC/DC prediction encoding method is selected and an AVC flag indicating the AVC intra prediction encoding method in the flag field when the AVC intra prediction encoding method is selected,
   wherein the AC/DC code amount is generated by entropy encoding a particular value obtained through the AC/DC prediction, and the AVC code amount is generated by entropy encoding a further value obtained through the AVC intra prediction.

2. The computer-readable medium according to claim 1, further comprising the step of checking whether said macro block is a predetermined unit of process and performing the steps of claim 1, only when said macro block is one of said predetermined units of process.

3. The computer-readable medium according to claim 1, wherein the step of selecting further comprises selecting one of the AC/DC prediction encoding method and the AVC intra prediction encoding method in accordance with a predetermined criterion, when said AC/DC code amount and said AVC code amount are equal to each other.

4. The computer-readable medium according to claim 1, wherein the flag field is included in a macro-block-layer (MB-layer) header of a bit stream.

5. A non-transitory, computer-readable medium containing computer readable instructions that cause a computer to perform a selective prediction decoding method for identifying a decoding method for a macro block, comprising the steps of:
   recognizing a prediction flag value identifying either an AC/DC coded macro block or an intra coded macro block, which flag value is included in a header of a received bit stream;
   decoding said received bit stream by one of an AC/DC prediction decoding process and an Advanced Video Coding (AVC) intra prediction decoding process in accordance with the recognized prediction flag value; and
   generating an AC/DC code amount by entropy encoding a particular value obtained through the AC/DC prediction, and generating an AVC code amount by entropy encoding a further value obtained through the AVC intra prediction.

6. The computer-readable medium according to claim 5, wherein the prediction flag value is recorded in a prediction flag field of a macro-block-layer (MB-layer) header of the bit stream.

* * * * *